US008919286B2

(12) United States Patent
Koch

(10) Patent No.: US 8,919,286 B2
(45) Date of Patent: Dec. 30, 2014

(54) MODULAR BALED HAY FEEDING SYSTEM AND METHOD FOR LIVESTOCK

(75) Inventor: Jeffrey A. Koch, McLouth, KS (US)

(73) Assignee: Progressive Products, Inc., Pittsburgh, KS (US)

( * ) Notice: Subject to any disclaimer, the term of this patent is extended or adjusted under 35 U.S.C. 154(b) by 337 days.

(21) Appl. No.: 13/553,580

(22) Filed: Jul. 19, 2012

(65) Prior Publication Data

US 2014/0020632 A1    Jan. 23, 2014

(51) Int. Cl.
*A01K 5/00*    (2006.01)
*A01K 39/00*    (2006.01)
*A01K 1/10*    (2006.01)

(52) U.S. Cl.
USPC ............................................. 119/60; 119/58

(58) Field of Classification Search
USPC ...................................... 119/58, 60
See application file for complete search history.

(56) References Cited

U.S. PATENT DOCUMENTS

| 4,002,147 | A | * | 1/1977 | Feterl | ............................. | 119/60 |
| 4,148,278 | A |   | 4/1979 | Anderson |   |   |
| 5,054,430 | A | * | 10/1991 | Weelink | ........................... | 119/60 |
| 5,067,442 | A | * | 11/1991 | Schilling | .......................... | 119/60 |
| 5,386,800 | A | * | 2/1995 | Pirok | .............................. | 119/58 |
| 5,947,055 | A |   | 9/1999 | Cross |   |   |
| 6,029,919 | A |   | 2/2000 | Rousseau |   |   |
| 7,073,460 | B1 | * | 7/2006 | Rasmussen et al. | ............ | 119/60 |
| 8,181,600 | B2 | * | 5/2012 | Smith | ............................. | 119/60 |
| 2006/0070578 | A1 |   | 4/2006 | Pavlik |   |   |
| 2006/0070580 | A1 | * | 4/2006 | Klene | ............................. | 119/60 |
| 2010/0263597 | A1 |   | 10/2010 | Kerns |   |   |

* cited by examiner

*Primary Examiner* — Monica Williams
(74) *Attorney, Agent, or Firm* — Law Office of Mark Brown, LLC; Mark E. Brown; Christopher M. DeBacker

(57) ABSTRACT

A system and method of feeding rolled bales of hay to livestock while simultaneously storing the hay off of the ground. The hay is presented in such a way that the livestock can graze on the hay bales at will, much as they would graze in a grass field. The system of storing and offering the hay bales is modular, and may be added to or subtracted from depending upon the size of the herd of livestock. Additionally, the invention is designed to be placed along an existing fence-line for simple access to the feeding system. This allows the system to act as a simple pass-through for hay bales for feeding purposes, as opposed to requiring that bales be physically picked up and placed on a feeder for each individual feeding. A trough for water or other types of feed may also be built directly into the system.

16 Claims, 7 Drawing Sheets

US 8,919,286 B2

MODULAR BALED HAY FEEDING SYSTEM AND METHOD FOR LIVESTOCK

BACKGROUND OF THE INVENTION

1. Field of the Invention

The present invention relates generally to a system and method for providing baled hay feed to livestock, and more specifically to a modular system capable of receiving round hay bales and a method of feeding livestock thereby.

2. Description of the Related Art

The feeding of livestock presents several challenges to farmers or ranchers. Feeding is both costly and time consuming Several options for feed are available to owners of livestock, including the use of baled hay. Baled hay is a pre-cut dried fodder used to feed livestock when field grazing is impossible, either due to location or climate. Hay may be baled in block shapes or cylindrical rolls. Traditionally, the bales would be broken down prior to feeding; however, this adds an additional time consuming step to the feeding process.

In order to avoid the step of breaking down the bales of hay, farmers and ranchers often simply place a block of hay into a pen or stable containing the livestock. This process, however, leads to significant waste of hay. The hay may be trampled or otherwise made inedible during the feeding process.

Most animals are fed hay in two daily feedings, morning and evening. However, this schedule is more for the convenience of humans, as most grazing animals on pasture naturally consume fodder in multiple feedings throughout the day. Some animals, especially those being raised for meat, may be given enough hay that they simply are able to eat all day. The proper amount of hay and the type of hay required varies somewhat between different species. An ideal feeding situation would allow the animal to graze on the hay as they would graze in a field.

Some attempts to provide hay feeders utilizing hay bales in block shapes have been attempted, but none have implemented a modular livestock feeder utilizing round rolled hay bales in the manner of the present invention.

Another issue with hay for feeding livestock is storage. Storing hay is not a problem if you are buying only a few weeks' worth at a time, but storage over several months requires more protection to avoid spoilage. Regardless of storage time, you will need a way to keep it from getting wet or drawing moisture from the ground. Placing hay bales directly on the ground for feeding leads to faster spoilage and is therefore an inadequate method of feeding. An ideal hay feeder would store the hay in such a way as to maximize its useful life.

Heretofore there has not been available a hay feeding system or method with the advantages and features of the present invention.

BRIEF SUMMARY OF THE INVENTION

The present invention generally provides a system and method of feeding rolled bales of hay to livestock while simultaneously storing the hay off of the ground. The hay is presented in such a way that the livestock can graze on the hay bales at will, much as they would graze in a grass field. The system of storing and offering the hay bales is modular, and may be added to or subtracted from depending upon the size of the herd of livestock. Additionally, the invention is designed to be placed along an existing fence-line for simple access to the feeding system. This allows the system to act as a simple pass-through for hay bales for feeding purposes, as opposed to requiring that bales be physically picked up and placed on a feeder for each individual feeding. A trough for water or other types of feed may also be built directly into the system.

The feeding system is primarily comprised of multiple frame members of steel or other suitable material. The frame members define feeding zones along the sides of each modular assembly whereby livestock will have access to the stored hay bale. The livestock can feed directly from the hay bale or from hay which has fallen to the ground from the hay bale.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof Forwardly and rearwardly are generally in reference to the direction of travel, if appropriate. Said terminology will include the words specifically mentioned, derivatives thereof and words of similar meaning.

II. Preferred Embodiment Hay Feeder System 2

Figure 1:
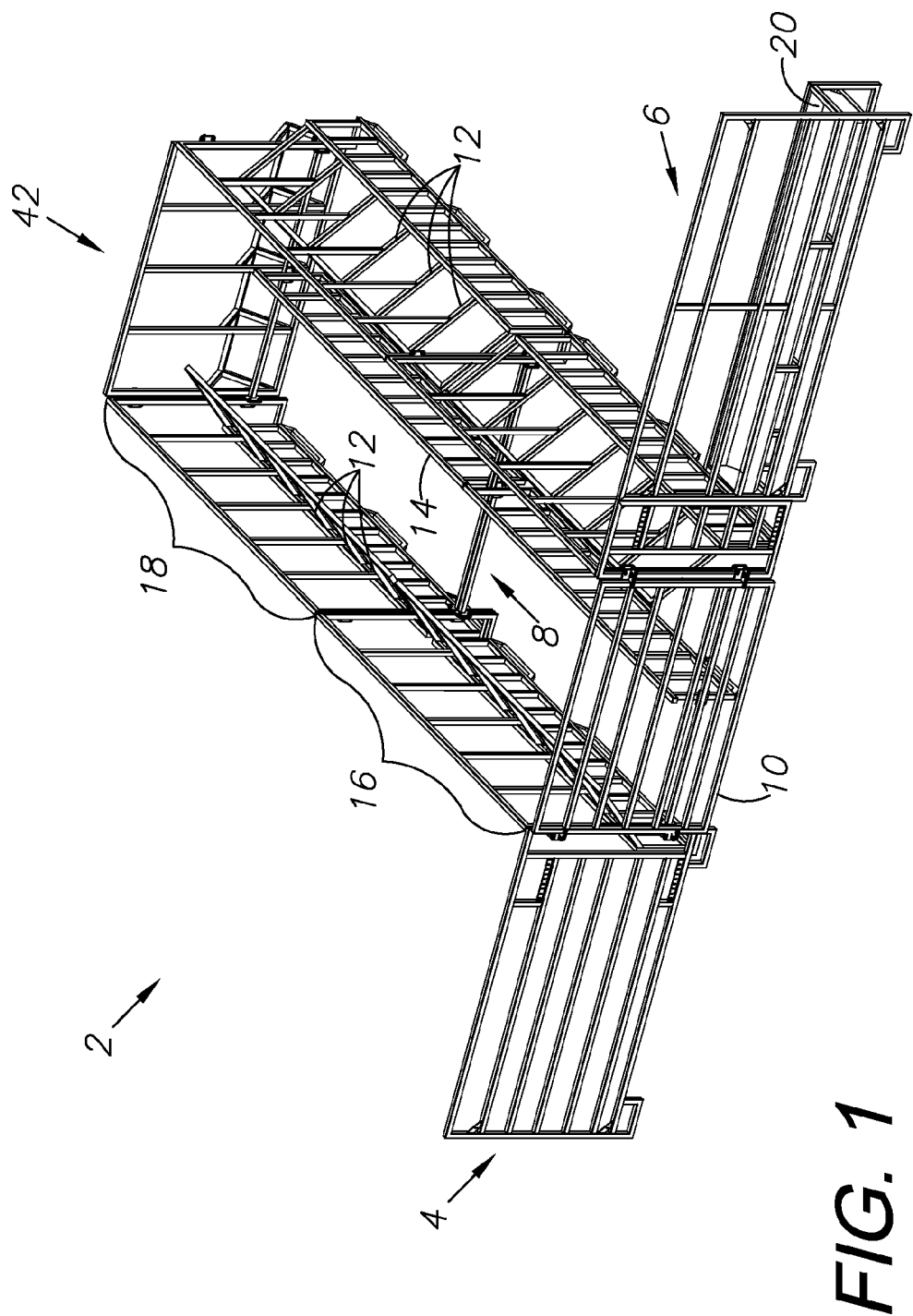
FIG. 1 is an isometric perspective diagram of an embodiment of the present invention.

The present invention preferably embodies a hay feeder system 2 which provides a method of feeding livestock using a rolled, cylindrical bale of hay 34. Generally, the system is adapted to be placed along a fence-line by incorporating at least a first fence wing 4 and a second fence wing 6, with a gate 10 in between, as shown in FIG. 1. A tractor or a loader with a bale spear attachment (not shown in the figures) will bring bales of hay to the feeder apparatus and load the bales through the gate opening and onto a pair of bale stopper cross-bars 13 and a central frame cross-bar 14. The bale stopper cross-bars 13 are held up by a number of bale stopper frame members 12. The space between the bale stopper cross-bars 13 and the central frame cross-bar 14 defines the hay storage zone 8. A trough 20 is optionally affixed to one of the fence wings 4, 6.

The system is primarily comprised of modular sections, such as a first modular section 16, and a second modular section 18 as shown in FIG. 1, which modular sections can be stacked to any number, allowing any number of hay bales to be loaded for feeding. Once a desired number of modular sections has been combined, a rear capping section 42 is connected to the last modular section.

Figure 2:
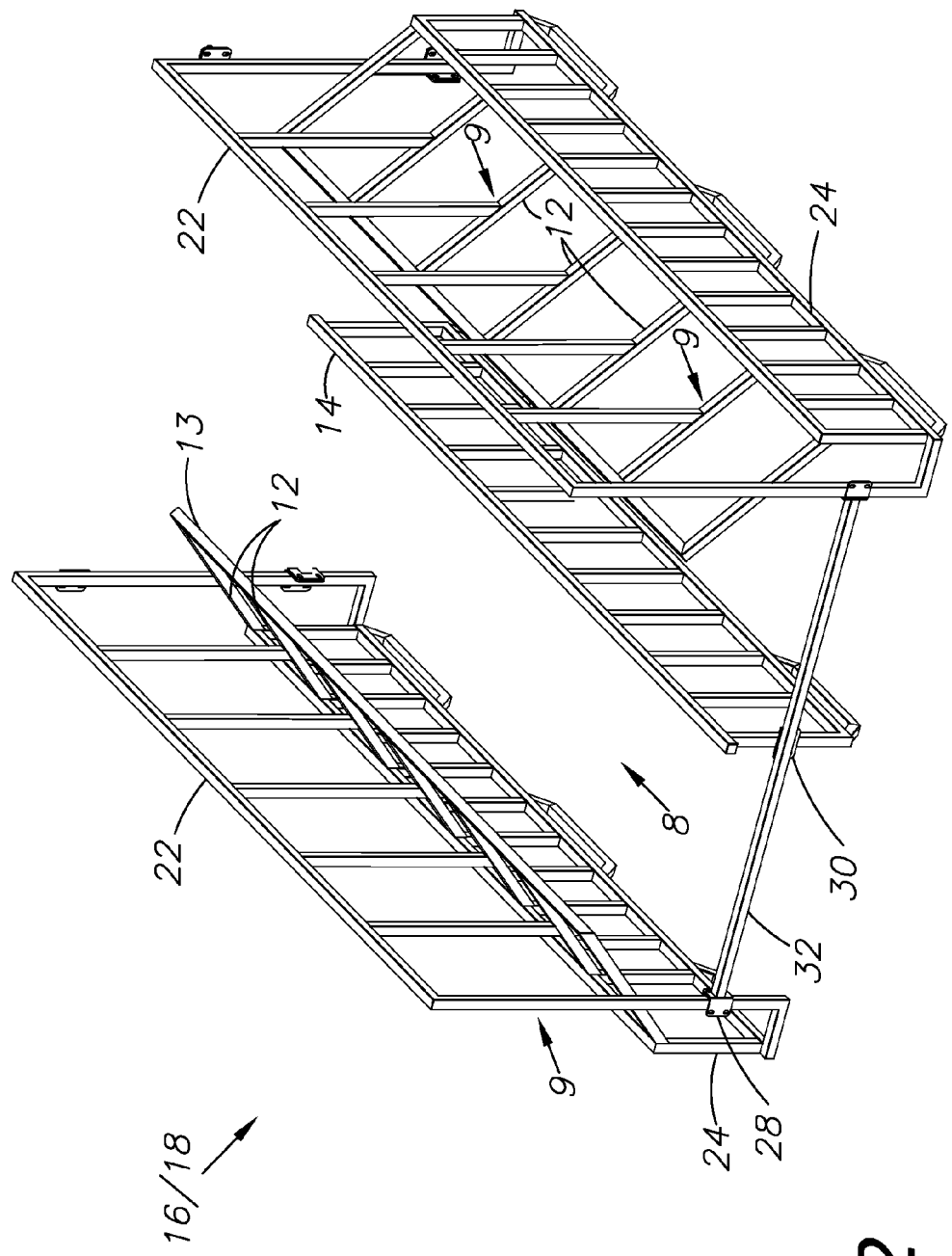
FIG. 2 is an isometric perspective diagram of a modular element of an embodiment of the present invention, primarily comprising the hay feeding section.

As shown in FIG. 2, a number of feeding zones 9 surround the modular sections 16, 18. These feeding zones provide livestock with access to the hay bale stored in the storage zone 8. The livestock approach the feeding zones which are defined by the vertical framework 22, the base framework 24, and the bale stopper members 12. A number of feeding zones are provided, which allow a number of livestock to feed off of a single or multiple hay bales at once.

Figure 3:
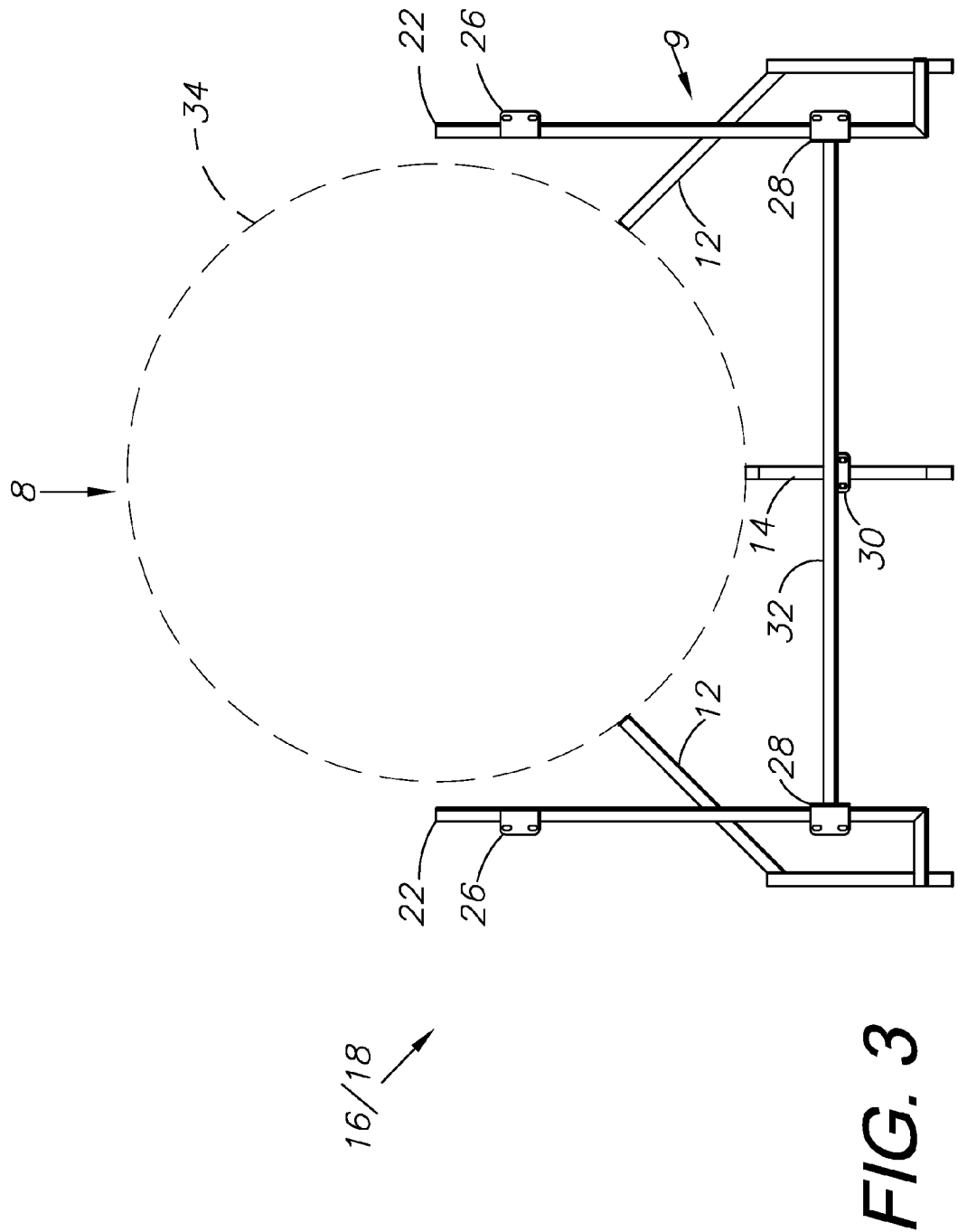
FIG. 3 is a front elevation of the same, indicating how a rolled hay bale would be stored.
Figure 4:
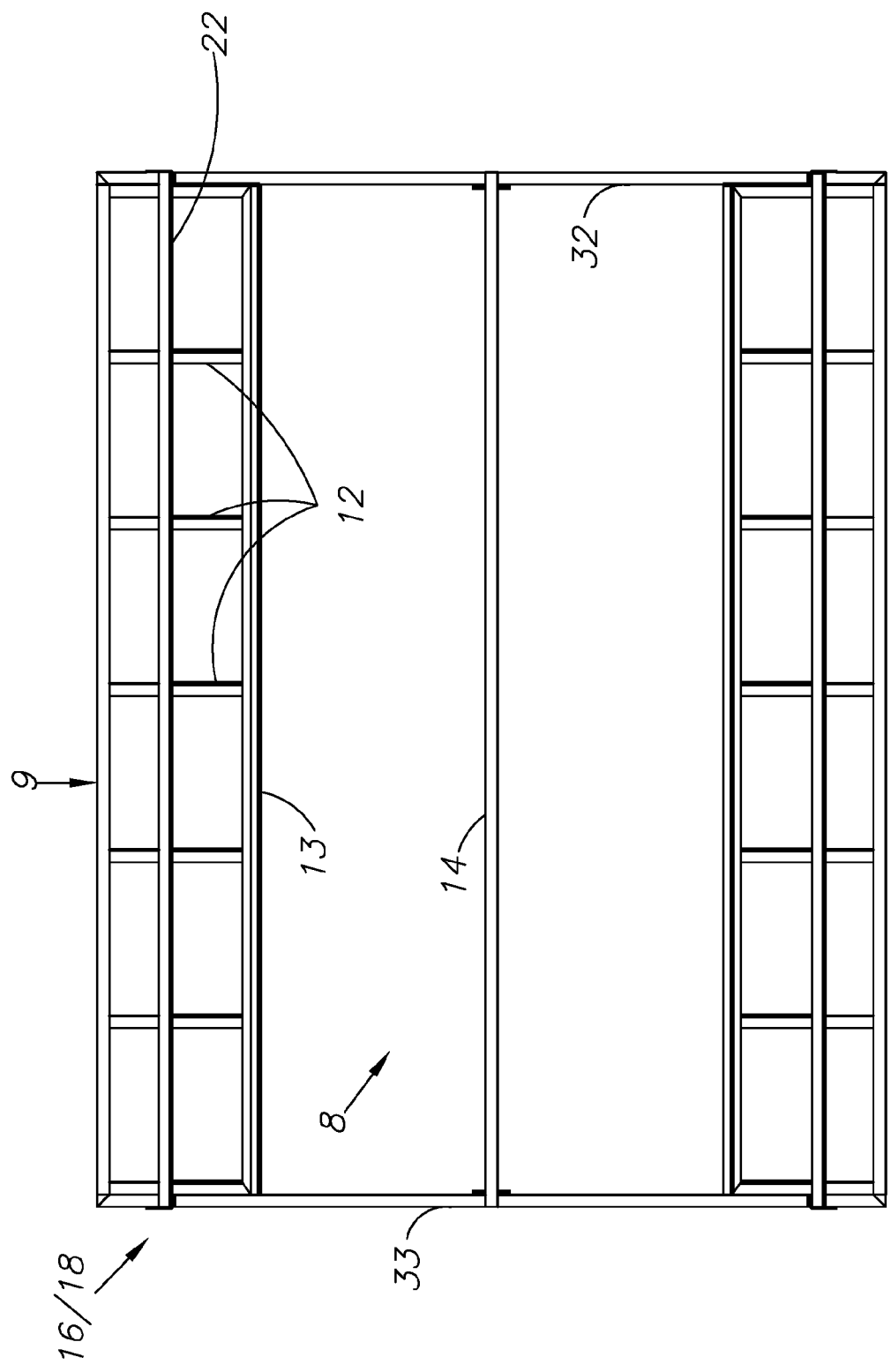
FIG. 4 is a top plan view of the same.

FIGS. 3 and 4 provide additional views of how the modular feeding section 16, 18 contains a bale of hay 34. Upper connections 26 and lower connections 28 allow the modular sections to be physically connected to the fence-line or to other modular sections. A front central connecting beam 32 or rear central connecting beam 33 may be affixed to the lower connections 28, and includes a central connection 30 for connecting to the gate 10 or the rear capping section 42, as shown in FIG. 1. They also allow for the central frame cross-bar 14 to be affixed to the rest of the system.

Figure 5:
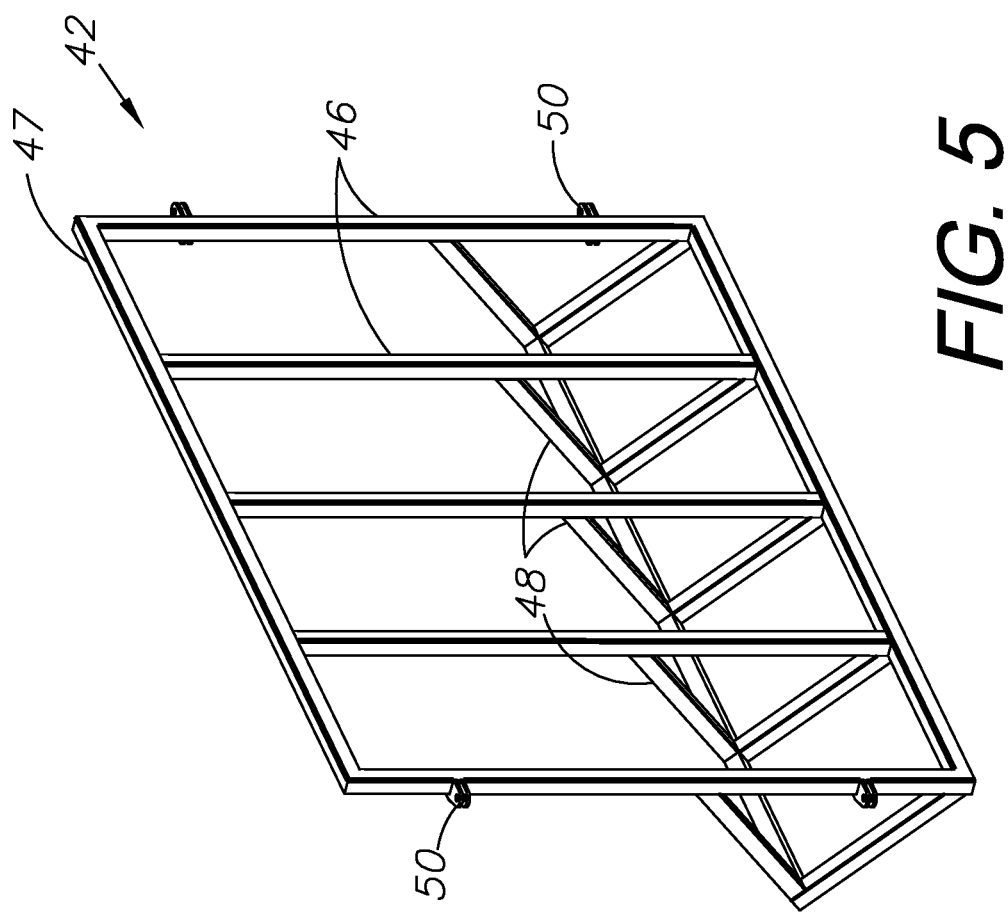
FIG. 5 is an isometric perspective diagram of an end wall of an embodiment of the present invention.
Figure 7:
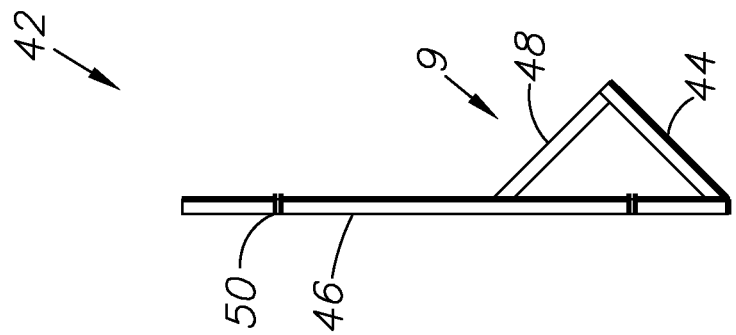
FIG. 7 is a side elevation of the same.
Figure 6:
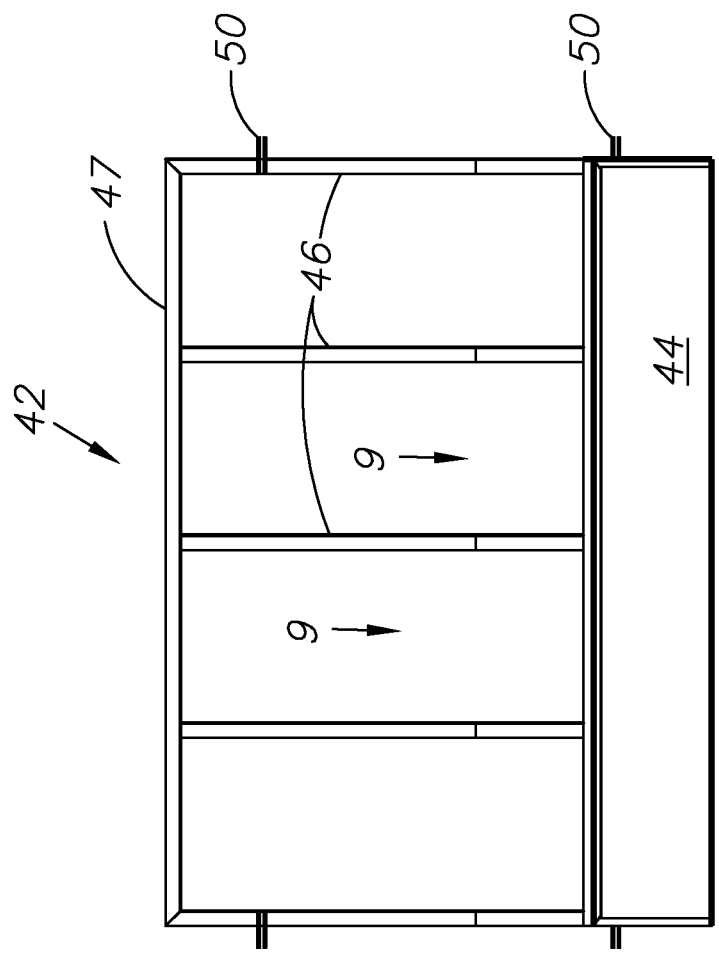
FIG. 6 is a rear elevation of the same.

FIGS. 5-7 show the rear capping section 42, which is affixed to the last modular section of the hay feeding system 2. The rear capping section 42 includes a number of connections 50 which align with the upper 26 and lower 28 connections of the modular sections. A bolt or other physically binding connection is made between the two elements. The rear capping section 42 is primarily comprised of a number of upstanding frame supports 46, horizontal frame supports 47, and angled frame supports 48. The angled frame supports establish additional feeding zones 9, as shown in FIG. 6. An optional plate 44 may be affixed to the lower part of the angled frame supports 48 to prevent a livestock animal from becoming stuck within the feeding system 2. Similar plates may be affixed to the framework of the modular sections.

Figure 9:
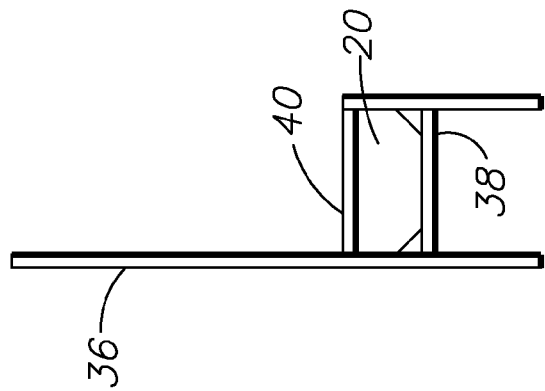
FIG. 9 is a side elevation of the same.
Figure 8:
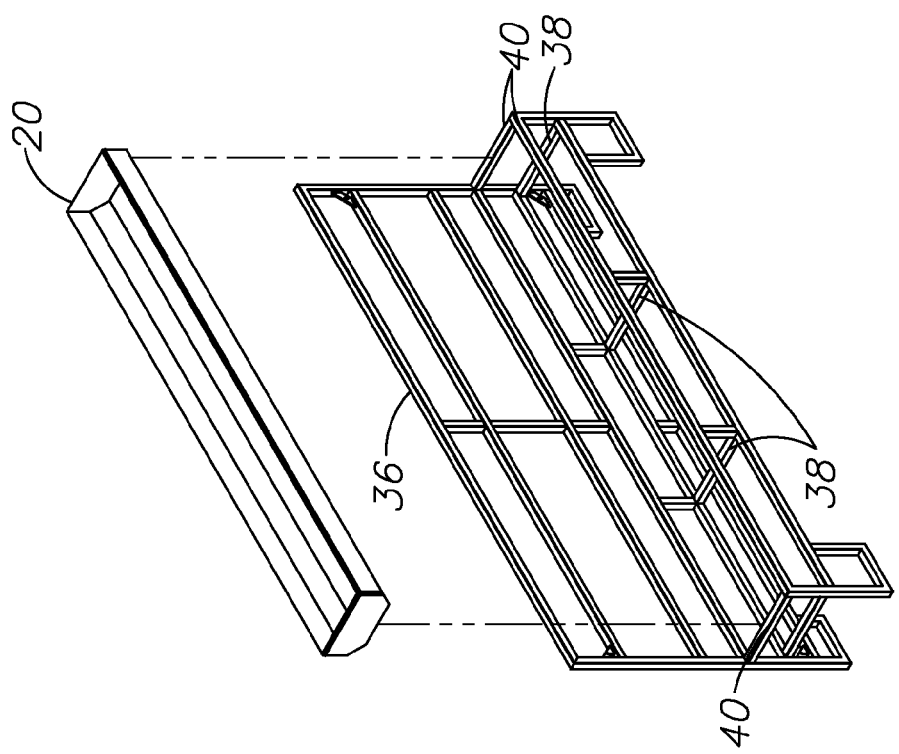
FIG. 8 is an isometric perspective diagram of a trough element included with an embodiment of the present invention, showing the interaction between the trough and the trough frame.

FIGS. 8 and 9 show the optional trough 20 and trough framing that may be included in one of the wing sections 4, 6. The trough is contained by a number of lower frame supports 38, upper frame supports 40, and the fence frame 36. The trough can be used to store water or other feed type next to the feeder system 2.

The advantages of the present invention over existing feeding systems include the ability to use round hay bales for feeding livestock directly. The cross-bars 13, 14 effectively store the bale off of the ground, preventing moisture from penetrating the bale. The livestock approach the bale at the feeding zones 9 and may eat hay that is still affixed to the bale 34, or hay which has come loose from the bale and fallen to the ground.

The modular aspect of the present invention allows an unlimited feeding surface to be established, which may be used by any number of livestock. If the owner increases his herd size, he can add additional modular sections to the feeding system 2. When the gate 10 is opened, a tractor is able to load a round hay bale into the system. That bale will push any existing bales rearward, toward the rear capping section 42. This process can be repeated until each modular section of the feeding system has received at least one bale of hay.

A further advantage of the present invention is that it allows the farmer or rancher to feed his livestock without needing to relocate the livestock. The present invention can be used perpendicular to an existing fence line, and access to the feeding portion of the system does not provide access to the pasture in general. This cuts back on the risk of livestock escaping, while allowing the farmer or rancher to clean out the hay storage zone 8 safely at any time.

It is to be understood that while certain embodiments and/or aspects of the invention have been shown and described, the invention is not limited thereto and encompasses various other embodiments and aspects.

Having thus described the disclosed subject matter, what is claimed as new and desired to be secured by Letters Patent is:

1. A livestock feeding system comprising:
   a frame defining a storage space adapted for receiving hay bales;
   said frame having a livestock feeding opening adapted for providing livestock access to said storage space;
   said frame having a bale-receiving opening adapted to receive hay bales;
   said frame having a bale support located in proximity to said livestock feeding opening and adapted for supporting a hay bale in proximity to and accessible by livestock through said livestock feeding opening,
   said frame comprising: a pair of upstanding side frames each comprising a base member, a top member, and a plurality of vertical members; an upstanding central frame comprising a base member, a top member, and a plurality of vertical members; a plurality of bale stopper frame members; a pair of bale stopper cross-bars affixed to said upstanding side frames; wherein said bale stopper cross-bars and said upstanding central frame top member comprise a storage space for containing a round hay bale; and wherein said upstanding side frame vertical members and plurality of bale stopper frame members define a feeding space providing access to said hay bale by livestock.

2. The livestock feeding system according to claim 1, which includes:
   said frame having opposite sides with said livestock feeding opening formed in one of said frame sides;
   said frame having opposite ends with said bale receiving opening formed in one of said frame ends; and
   said storage space being adapted to receive multiple hay bales through said bale-receiving opening.

3. The livestock feeding system according to claim 2, which includes:
   said frame end with said bale-receiving opening being adapted for placement at a fence line with said bale-receiving opening open at one side of said fence line and said storage space with said livestock feeding opening located on the other side of said fence line.

4. The livestock feeding system according to claim 3, which includes:
   said storage space being configured to receive multiple hay bales in a linearly aligned row; and
   said storage space being adapted for loading with a row of multiple hay bales sequentially pushed through said bale-receiving opening.

5. The livestock feeding system according to claim 4, which includes:
   a frame assembly comprising multiple said frames linked together end-to-end in a linearly-aligned configuration and defining said storage space extending linearly through said frame assembly.

6. The livestock feeding system of claim 1, further comprising: a modular assembly comprising said pair of upstanding side frame members, said upstanding central frame, said pair of bale stopper cross-bars, and said plurality of bale stopper frame members; said modular assembly having a front end and a rear end; and a plurality of connection points affixed to said modular assembly front end and rear end.

7. The livestock feeding system of claim 6, further comprising:
a pair of fence wings, each said wing affixed to one of said pair of upstanding side frames;
a gate section affixed to said fence wings, said gate capable of being placed in an open position and a closed position; and
wherein access is provided to said storage space when said gate is in said open position.

8. The livestock feeding system of claim 6, further comprising:
a rear capping section comprised of a plurality of upstanding framing members, a top framing member, a bottom framing member, and a plurality of diagonal framing members;
each pair of said diagonal framing members define a feeding space providing access to said hay bale by livestock; and
said rear capping section adapted to connect to an end of said modular assembly via said connection points.

9. The livestock feeding system of claim 6, wherein a first modular assembly rear end is affixed to a second modular assembly front end via said connection points.

10. A livestock feeding system comprising:
a first modular assembly comprising a pair of upstanding side frame members, a single upstanding central frame, a pair of bale stopper cross-bars, and a plurality of bale stopper frame members joining each one of said bale stopper cross-bars to one of said upstanding side frame members;
a second modular assembly comprising a pair of upstanding side frame members, a single upstanding central frame, a pair of bale stopper cross-bars, and a plurality of bale stopper frame members joining each one of said bale stopper cross-bars to one of said upstanding side frame members;
said bale stopper cross-bars capable of defining a storage space for storing a round hay bale;
each said modular assembly including a front end and a rear end;
said first modular assembly rear end affixed to said second modular assembly front end;
a pair of fence wings, each said wing affixed to one of said first modular assembly upstanding side frames;
a gate section affixed to said fence wings, said gate capable of being placed in an open position and a closed position;
wherein access is provided to said storage space when said gate is in said open position;
a rear capping section comprised of a plurality of upstanding framing members, a top framing member, a bottom framing member, and a plurality of diagonal framing members;
each pair of said diagonal framing members define a feeding space providing access to said hay bale by livestock; and
said rear capping section adapted to connect to said second modular assembly rear end.

11. A method of feeding livestock, the method comprising the steps:
providing a frame defining a storage space adapted for receiving hay bales, said frame having a livestock feeding opening adapted for providing livestock access to said storage space, and a bale-receiving opening adapted to receive hay bales;
said frame comprising: a pair of upstanding side frames each comprising a base member, a top member, and a plurality of vertical members; an upstanding central frame comprising a base member, a top member, and a plurality of vertical members; a plurality of bale stopper frame members; a pair of bale stopper cross-bars affixed to said upstanding side frames; wherein said bale stopper cross-bars and said upstanding central frame top member comprise a storage space for containing a round hay bale; and wherein said upstanding side frame vertical members and plurality of bale stopper frame members define a feeding space providing access to said hay bale by livestock;
providing a bale support located in proximity to said livestock feeding opening and adapted for supporting a hay bale in proximity to and accessible by livestock through said livestock feeding opening;
providing a vehicle including a bale spear capable of transporting said hay bales;
loading a hay bale onto said bale spear;
transporting a round hay bale to said bale-receiving opening; and
transferring said round hay bale from said bale spear into said storage space within said frame.

12. The method of feeding livestock of claim 11, wherein said frame and said bale support comprise a modular assembly having a front end located at said bale-receiving opening, and a rear end located opposite of said bale-receiving opening.

13. The method of feeding livestock of claim 12, further comprising the steps:
providing a first said modular assembly and a second said modular assembly; and
joining said first modular assembly rear end to said second modular assembly front end.

14. The method of feeding livestock of claim 13, further comprising the steps:
providing a rear capping section comprised of a plurality of upstanding framing members, a top framing member, a bottom framing member, and a plurality of diagonal framing members, each pair of said diagonal framing members defining a feeding space providing access to said hay bale by livestock; and
connecting said rear capping section to said second modular assembly rear end.

15. The method of feeding livestock of claim 13, further comprising the steps:
providing a pair of fence wings, each said wing affixed to one of said pair of upstanding side frames of said first modular assembly front end;
connecting a gate section to said fence wings, said gate capable of being placed in an open position and a closed position; and
said gate being operable to provide or block access to said bale-receiving opening.

16. The method of feeding livestock of claim 13, further comprising the steps:
providing a second hay bale;
loading said second hay bale onto said bale spear;

transporting said round hay bale to said bale-receiving opening; and transferring said round hay bale from said bale spear into said storage space within said frame, such that all hay bales already loaded within said storage space are physically displaced rearwardly away from said bale-receiving opening.

\* \* \* \* \*